(12) United States Patent
Ding et al.

(10) Patent No.: US 12,306,934 B2
(45) Date of Patent: May 20, 2025

(54) SYSTEMS, METHODS, AND APPARATUSES FOR INTEGRATING A DEFENSE MECHANISM INTO DEEP-LEARNING-BASED SYSTEMS TO DEFEND AGAINST ADVERSARIAL ATTACKS

(71) Applicants: Yuzhen Ding, Tempe, AZ (US); Nupur Thakur, Tempe, AZ (US); Baoxin Li, Chandler, AZ (US)

(72) Inventors: Yuzhen Ding, Tempe, AZ (US); Nupur Thakur, Tempe, AZ (US); Baoxin Li, Chandler, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 542 days.

(21) Appl. No.: 17/730,051

(22) Filed: Apr. 26, 2022

(65) Prior Publication Data
US 2023/0018948 A1    Jan. 19, 2023

Related U.S. Application Data

(60) Provisional application No. 63/180,605, filed on Apr. 27, 2021.

(51) Int. Cl.
*G06F 21/55* (2013.01)
*G06N 3/04* (2023.01)
(Continued)

(52) U.S. Cl.
CPC ............... *G06F 21/55* (2013.01); *G06N 3/04* (2013.01); *G06N 3/063* (2013.01); *G06N 20/10* (2019.01)

(58) Field of Classification Search
CPC .......... G06F 21/55; G06N 20/10; G06N 3/04; G06N 3/063
See application file for complete search history.

(56) References Cited

U.S. PATENT DOCUMENTS 9,892,256 B1 *  2/2018  Lango .................... G06F 21/53
10,965,712 B2 *  3/2021  Dani .................. H04L 63/1416
(Continued)

OTHER PUBLICATIONS

Athalye et al., "Synthesizing Robust Adversarial Examples", arXiv, Oct. 30, 2017, 18 pp., arXiv:1707.07397v2.
(Continued)

*Primary Examiner* — Rupal Dharia
*Assistant Examiner* — Devin E Almeida
(74) *Attorney, Agent, or Firm* — Shumaker & Sieffert, P.A.

(57) ABSTRACT

Described herein are means for integrating a defense mechanism into deep-learning-based systems to defend against adversarial attacks. For instance, an exemplary system is specially configured for adding a convolutional defense layer to a neural network containing orthogonal kernels. Such a system generates the convolutional defense layer based on generating a set of learned kernals to increase diversity of network architecture, in which generating the set of learned kernals includes feeding an output of the convolutional defense layer into the neural network, further in which generating the convolutional defense layer includes selecting one or more orthogonal kernals, duplicating as needed and arranging them in a particular order. Such an embodiment further includes training the neural network with the added convolutional defense layer based on the increased diversity of network architecture; and defending against adverse attacks via constraining the effect of adversarial data generated by the adversarial attacks.

20 Claims, 17 Drawing Sheets

(51) Int. Cl.
  *G06N 3/063* (2023.01)
  *G06N 20/10* (2019.01)

(56) References Cited

U.S. PATENT DOCUMENTS

| | | | | |
|---|---|---|---|---|
| 2019/0220605 | A1* | 7/2019 | Kounavis | G06N 3/045 |
| 2020/0082097 | A1* | 3/2020 | Poliakov | G06F 21/577 |
| 2020/0184278 | A1* | 6/2020 | Zadeh | G06N 3/044 |
| 2021/0034737 | A1* | 2/2021 | Khan | G06F 21/554 |
| 2021/0216859 | A1* | 7/2021 | Liu | G06N 3/045 |

OTHER PUBLICATIONS

Burges et al., "A Tutorial on Support Vector Machines for Pattern Recognition", Data Mining and Knowledge Discovery, vol. 2, Kluwer Academic Publishers, Boston, USA, Jan. 1998, pp. 121-167.

Carlini et al., "Towards Evaluating the Robustness of Neural Networks", 2017 Symposium on Security and Privacy, IEEE Computer Society, San Jose, CA, USA, May 22, 2017, pp. 39-57, DOI: 10.1109/SP.2017.49.

Dong et al., "Evading Defenses to Transferable Adversarial Examples by Translation-Invariant Attacks", Proceedings of the IEEE Conference on Computer Vision and Pattern Recognition, CVPR, Apr. 5, 2019, pp. 4307-4316.

Dubey et al., "Defense Against Adversarial Images using Web-Scale Nearest-Neighbor Search", In Proceedings of the IEEE Conference on Computer Vision and Pattern Recognition, Mar. 9, 2019, pp. 8759-8768.

Finlay et al., "The LogBarrier adversarial attack: making effective use of decision boundary information", . In Proceedings of the IEEE International Conference on Computer Vision, Mar. 25, 2019, pp. 4861-4869.

Gilmer et al., "Adversarial Spheres", arXiv, arXiv:1801.02774v1, Jan. 9, 2018, 15 pp.

Gilmer et al., "The Relationship Between High-Dimensional Geometry and Adversarial Examples", arXiv, arXiv:1801.02774v3, Sep. 10, 2018, 15 pp.

Goodfellow et al., "Explaining and Harnessing Adversarial Examples", arVix, arXiv:1412.6572, Dec. 20, 2014, 10 pp.

Guo et al., "Countering Adversarial Images Using Input Transformations", arXiv, arXiv:1711.0011v2, Dec. 22, 2017, 12 pp.

Liu et al., "Delving into Transferable Adversarial Examples and Block-Box Attacks", arXiv, arXiv:1611.02770v2, Nov. 21, 2016, 24 pp.

Liu et al., "Detection based Defense against Adversarial Examples from the Steganalysis Point of View", In Proceedings of the IEEE Conference on computer vision and pattern recognition, 2019, pp. 4820-4829, (Applicant points out, in accordance with MPEP 609.04(a), that the year of publication, 2019, is sufficiently earlier than the effective U.S. filing date, so that the particular month of publication is not an issue.).

Luo et al., "Foveation-Based Mechanisms Alleviate Adversarial Examples", arXiv, arXiv:1511.06292v1, Nov. 19, 2015, 23 pp.

Madry et al., "Towards Deep Learning Models resistant to Adversarial Attacks", arXiv, arXiv:1706.06083v3, Nov. 9, 2017, 27 pp.

Manevitz et al., "One-Class SVMs for Document Classification", Jounral of Machine Learning Research, vol. 2, Jan. 2001, pp. 139-154, DOI: 10.1162/15324430260185574.

Moosavi-Dezfooli et al., "DeepFool: a simple and accurate method to fool deep neural networks", IEEE Conference on Computer Vision and Pattern Recognition, IEEE Computer Society, 2016, pp. 2574-2582, (Applicant points out, in accordance with MPEP 609.04(a), that the year of publication, 2016, is sufficiently earlier than the effective U.S. filing date, so that the particular month of publication is not an issue.).

Nguyen et al., "Deep Neural Networks are Easily Fooled: High Confidence Predictions for Unrecognizable Images", 2015 IEEE Conference on Computer Vision and Pattern Recognition (CVPR), Computer Vision Foundation, Boston, MA, USA, Oct. 15, 2015, pp. 427-436, doi: 10.1109/CVPR.2015.7298640.

Papernot et al., "Distillation as a Defense to Adversarial Perturbations against Deep Neural Networks", 37th IEEE Symposium on Security & Privacy, IEEE, San Jose, CA, USA, Mar. 14, 2016, pp. 582-597, DOI: 10.1109/SP.2016.41.

Poursaeed et al., "Generative Adversarial Perturbations", Proceedings of the IEEE Conference on Computer Vision and Pattern Recognition (CVPR), IEEE, Dec. 6, 2017, pp. 4422-4431, DOI:10.1109/CVPR.2018.00465.

Song et al., "Constructing Unrestricted Adversarial Examples with Generative Models", Advances in Neural Information Processing Systems, May 1, 2018, 12 pp., https://doi.org/10.48550/arXiv.1805.07894.

Szegedy et al., "Intriguing properties of neural networks", arXiv, arXiv:1312.6199v1, Dec. 21, 2013, 9 pp.

Xiao et al., "Generating Adversarial Examples with Adversarial Networks", arXiv, arXiv:1801.02610v2, Jan. 9, 2018, 15 pp.

Xie et al., "Mitigating Adversarial Effects Through Randomization", arXiv, arXiv:1711.01991v1, Nov. 6, 2017, 11 pp.

Yao et al., "Trust Region Based Adversarial Attack on Neural Networks", Proceedings of the IEEE/CVF Conference on Computer Vision and Pattern Recognition (CVPR), Jun. 2019, pp. 11342-11351, DOI:10.1109/CVPR.2019.01161.

Zheng et al., "Distributionally Adversarial Attack", Proceedings of the AAAI Conference on Artificial Intelligence, vol. 33, ACM, Jan. 27, 2019, pp. 2253-2260, https://doi.org/10.1609/aaai.v33i01.33012253.

* cited by examiner

Algorithm 1 Ortho-K Defender: Training

Input: Training set $X_t$, Validation set $X_v$, # of defense kernels $N-1$, Defense network, Validation accuracy of original model $C$.

while Validation accuracy is NOT $\approx$ to $C$ do
  for each batch in $X_t$ do
    Construct $d_u$ by randomly picking kernel $k_i, i \in (N-1)$ from $S_K$ and duplicating it.
    Update weights $w$ using gradient descent.
  end for
  for each batch in $X_v$ do
    Shuffle the order of kernels in $S_K$
    Calculate accuracy on validation set
  end for
end while

FIG. 4

Algorithm 2 Ortho-K Defender: Deployment
---
Input: Orthogonal Set $S_K$, the Defense Network.

Construct the defense layer $d_u$ by randomly picking kernels from $S_K$ and duplicate the picked kernels in the rest of the layer. The kernels picked and the way they are placed in $d_u$ is kept unknown to the attacker.

FIG. 5

Table 1 - 675

| Network | w/o Defense | with Defense |
|---|---|---|
| LeNet-5 (MNIST) Ortho-24 | 99.1% | 96.59% |
| VGG-19 (CIFAR-10) VGG-19 (CIFAR-10) | 93% | 92% 88% |
| VGG-19 (CIFAR-100) Ortho-26 | 71.2% | 65.6% |

FIG. 6

Table 2 - 775

| Defense | FGSM | DeepFool | C&W | GAP |
|---|---|---|---|---|
| Retraining* | 63.63% | 99.01% | 99.8% | 49.09% |
| BDR-8 | 69.83% | 32.09% | 44.12% | 49.87% |
| JPEG | 61.17% | 35.80% | 41.34% | 33.06% |

FIG. 7

Table 3 - 875

| Attack Algorithm | FGSM | | DeepFool | | C&W | | GAP | |
|---|---|---|---|---|---|---|---|---|
| | Average | Worst | Average | Worst | Average | Worst | Average | Worst |
| Ortho-24 LeNet-5 - MNIST | | | | | | | | |
| Ortho-24 (1) | 12.65% | 14.84% | 13.52% | 15.18% | 10.03% | 15.35% | 11.31% | 14.01% |
| Ortho-24 (2) | 12.23% | 13.45% | 12.14% | 14.09% | 7.33% | 13.44% | 9.96% | 10.13% |
| Ortho-24 (1+1) | 14.10% | 15.49% | 17.86% | 21.54% | 11.25% | 14.36% | - | - |
| Ortho-24 (1+2) | 13.35% | 14.67% | 19.65% | 24.26% | 11.1% | 15.5% | - | - |
| Ortho-24 (2+2) | 13.28% | 14.14% | 22.25% | 30.03% | 7.25% | 7.68% | - | - |
| original LeNet-5 - MNIST | | | | | | | | |
| - | 95.67% | | 93.43% | | 99% | | 80.2% | |
| Ortho-24 VGG19 - CIFAR-10 | | | | | | | | |
| Ortho-26 (1) | 26.08% | 34.98% | 9.25% | 12.79% | 2.64% | 4.09% | 13.86% | 29.7% |
| Ortho-26 (2) | 26.31% | 37.46% | 9.43% | 12.58% | 3.63% | 5.28% | 3.73% | 7.87% |
| Ortho-26 (1+1) | 26.22% | 32.24% | 10.21% | 12.64% | 3.09% | 4.3% | - | - |
| Ortho-26 (1+2) | 20.15% | 32.08% | 9.58% | 13.23% | 3.19% | 4.73% | - | - |
| Ortho-26 (2+2) | 18.29% | 32.43% | 9.52% | 12.89% | 3.64% | 5.67% | - | - |
| Ortho-74 VGG19 - CIFAR-10 | | | | | | | | |
| Ortho-74 (1) | 28.57% | 39.02% | 8.52% | 17.72% | 5.43% | 7.29% | 10.07% | 13.22% |
| Ortho-74 (2) | 30.22% | 42.1% | 6.75% | 10.66% | 6.3% | 6.38% | 7.6% | 15.52% |
| Ortho-74 (1+1) | 32.13% | 42.27% | 10.25% | 13.76% | 6.5% | 9.25% | - | - |
| Ortho-74 (1+2) | 29.26% | 43.26% | 10.15% | 12.59% | 7.28% | 8.38% | - | - |
| Ortho-74 (2+2) | 31.22% | 41.89% | 9.99% | 15.62% | 7.64% | 7.52% | - | - |
| original VGG19 - CIFAR-10 | | | | | | | | |
| - | 82.41% | | 98.6% | | 99.3% | | 82.1% | |
| Ortho-26 VGG19 - CIFAR-100 | | | | | | | | |
| Ortho-26 (1) | 40.15% | 62.66% | 45.28% | 51.76% | 21.45% | 22.97% | 12.25% | 15.45% |
| Ortho-26 (2) | 25.57% | 67.38% | 32.41% | 52.68% | 21.67% | 28.95% | 12.7% | 26.96% |
| Ortho-26 (1+1) | 33.13% | 61.23% | 40.57% | 49.08% | 29.31% | 30.88% | - | - |
| Ortho-26 (1+2) | 39.78% | 61.09% | 43.25% | 52.03% | 29.31% | 33.31% | - | - |
| Ortho-26 (2+2) | 35.22% | 63.76% | 35.60% | 49.22% | 27.25% | 33.96% | - | - |
| original VGG19 - CIFAR-100 | | | | | | | | |
| - | 84.31% | | 99.5% | | 92.77% | | 76.03% | |

FIG. 8

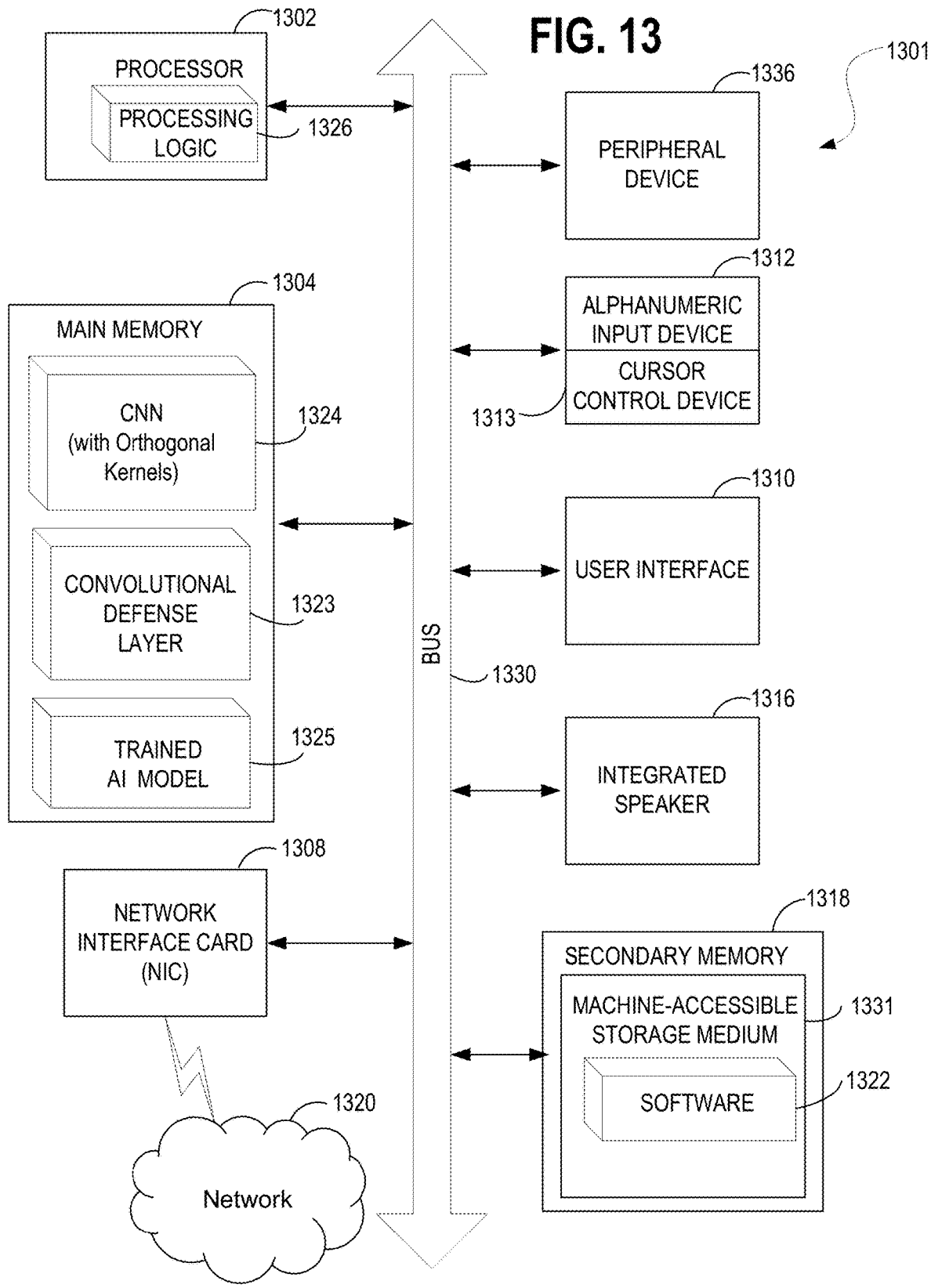

ature_ref id="1" />

SYSTEMS, METHODS, AND APPARATUSES FOR INTEGRATING A DEFENSE MECHANISM INTO DEEP-LEARNING-BASED SYSTEMS TO DEFEND AGAINST ADVERSARIAL ATTACKS

CLAIM OF PRIORITY

This non-provisional U.S. Utility Patent Application is related to, and claims priority to the U.S. Provisional Patent Application No. 63/180,605, entitled "SYSTEMS, METHODS, AND APPARATUSES FOR INTEGRATING A DEFENSE MECHANISM INTO DEEP-LEARNING-BASED SYSTEMS TO DEFEND AGAINST ADVERSARIAL ATTACKS," filed Apr. 27, 2021, the entire contents of which are incorporated herein by reference.

GOVERNMENT RIGHTS AND GOVERNMENT AGENCY SUPPORT NOTICE

This invention was made with government support under N00014-19-1-2119 awarded by Office of Naval Research. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of machine learning and defense mechanisms for deep neural networks, and more particularly, to systems, methods, and apparatuses for integrating a defense mechanism into deep-learning-based systems to defend against adversarial attacks.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Deep neural networks have been shown to be vulnerable to adversarial attacks. Typical attack strategies alter authentic data subtly so as to obtain adversarial samples that resemble the original but otherwise would cause a network's misbehavior such as a high misclassification rate.

Problematically, current defense mechanisms have shortcomings when the attacker is aware of the utilized defense strategy and still leave deep neural networks prone to attack. Embodiments described herein therefore provide enhanced solutions to improve upon conventionally known defense mechanisms that can be implemented on existing neural networks and can withstand attacks even if the attacker is aware of the defense mechanism being utilized.

The present state of the art may therefore benefit from the systems, methods, and apparatuses for integrating a defense mechanism into deep-learning-based systems to defend against adversarial attacks, as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 4 depicts Algorithm 1 used to train the network, in accordance with described embodiments;

FIG. 5 depicts Algorithm 2 used to deploy the network for classification, in accordance with described embodiments;

FIG. 6 depicts Table 1 which shows test accuracy of networks with and without Ortho-K defense, in accordance with described embodiments;

FIG. 7 depicts Table 2 which shows fooling rate for different attacks after various defenses are applied on the CIFAR-10 dataset, in accordance with described embodiments;

FIG. 8 depicts Table 3 which shows fooling rate of different attacks on the original network and variations of Ortho-K Defender, in accordance with described embodiments;

FIG. 13 illustrates a diagrammatic representation of a machine in the exemplary form of a computer system, in accordance one embodiment.

DETAILED DESCRIPTION

Figure 1:
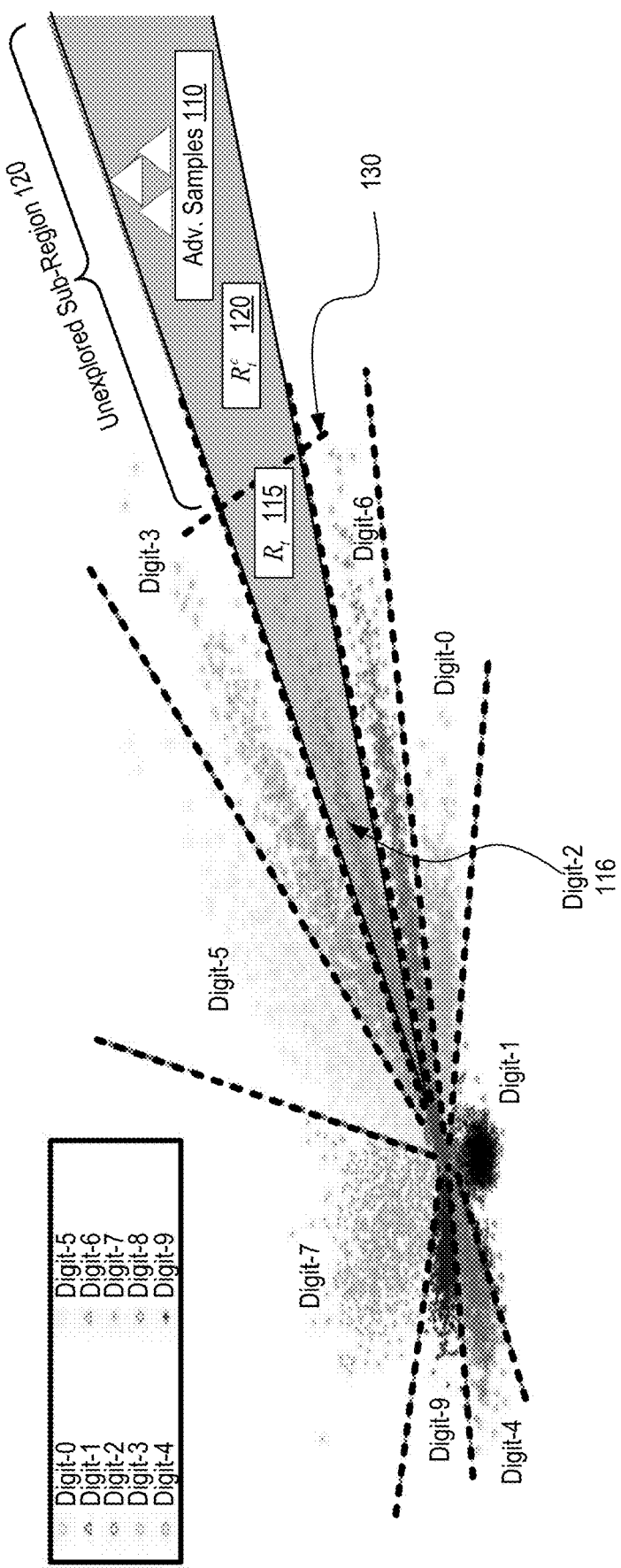
FIG. 1 depicts the decision subspace in 2-D for LeNet-5 trained with the MNIST images and the decision boundaries, in accordance with described embodiments.

Described herein are systems, methods, and apparatuses for integrating a defense mechanism into deep-learning-based systems to defend against adversarial attacks. For instance, an exemplary system is specially configured for adding a convolutional defense layer to a neural network containing orthogonal kernels. Such a system generates the convolutional defense layer based on generating a set of learned kernels to increase diversity of network architecture, in which generating the set of learned kernels includes feeding an output of the convolutional defense layer into the neural network, further in which generating the convolutional defense layer includes selecting one or more orthogonal kernels, duplicating as needed and arranging them in a particular order. Such an embodiment further includes training the neural network with the added convolutional defense layer based on the increased diversity of network architecture; and defending against adverse attacks via constraining the effect of adversarial data generated by the adversarial attacks.

Deep neural networks have proven to be highly vulnerable to adversarial attacks, which poses a threat to their real-world application, especially for security-sensitive systems. Typical attack strategies alter authentic data subtly so as to obtain adversarial samples that resemble the original but otherwise would cause a network's misbehavior such as a high misclassification rate. In the current literature, various defense mechanisms have been reported, with some showing state-of-the-art performance in defending common attacks. Yet, most of these defenses fail when the attacker is given knowledge of the defense strategy. Described herein is a novel defense approach, termed Ortho-K Defender, which can remain effective for defending against state-of-the-art adversarial attacks, even if the attacker has full knowledge of the defense mechanism.

The key idea of Ortho-K Defender is to introduce one additional defense layer that consists of orthogonal kernels to be trained together with any given network. This strategy of network training leads to a new network that can deliver a classification performance close to the original while providing a prohibitively huge number of specific network architectures by varying the selection of the kernels and their permutations, thus thwarting strong attackers that often rely on knowing a network's specific architecture for generating adversarial samples. With extensive experiments, it has been demonstrated that the proposed approach leads to a significant decrease in the success rate of recent white-box and black-box attacks, demonstrating that Ortho-K can provide an effective way of securing deep networks.

Introduction—Recent literature has documented the remarkable achievements of deep neural networks in many machine learning and computer vision tasks such as image classification, face recognition, and image reconstruction, etc. Though they may outperform humans in many of these tasks, deep networks have been found to be vulnerable to adversarial attacks. For instance, subtle modifications to an input image may lead to drastic change of the output of the network.

Depending on the extent of access an attacker has to the target network, the attacks can be classified as white-box or black-box attacks. A white-box attacker has the knowledge of the target network architecture and its gradients, while such knowledge is unknown to black-box attackers. Accordingly, in general it is more difficult to defend against a white-box attacker, who may exploit the knowledge of the target network in producing adversarial data.

Recent studies have shown that extreme linearity of the network is one reason why the adversarial examples exist. If the network has ample dimensions, it will be vulnerable to adversarial perturbations due to high dimensional dot products. It has been hypothesized that the existence of adversarial examples is due to the combination of two factors—high dimensional geometry of data manifolds and non-zero error rates. With regard to the ImageNet dataset, convolutional neural networks (CNNs) are believed to act linearly in regions of an image corresponding to the recognized object, although they may or may not act linearly in the rest of the image. While such studies have provided good insights into why adversarial examples exist, they do not readily lead to solutions for defending adversarial attacks.

The presence of adversarial examples poses a major security threat as neural networks are being used for various real-world applications like surveillance, autonomous driving, and access control, etc. Recent years have seen increasing interest in developing strategies to defend a network against adversarial attacks. Unfortunately, many existing approaches would fail if the attacker gains access to the underlying network and its defense mechanism. Some approaches rely on gradient masking (hiding the gradients) to defend attacks the employ the network gradients, but this becomes ineffective due to transferability of the adversarial examples, meaning that the attack may employ a substitute network to produce adversarial images.

Described herein is a novel defense approach, termed Ortho-K Defender, which can remain effective for defending against state-of-the-art adversarial attacks, even if the attacker has full knowledge of the defense mechanism. The key idea of Ortho-K Defender is to introduce one additional defense layer that consists of orthogonal kernels to be trained together with any given network. This strategy of network training leads to a new network that can deliver a classification performance close to the original while providing a prohibitively huge number of specific network architectures by varying the selection of the kernels and their permutations, thus thwarting strong attackers that often rely on knowing a network's specific architecture for generating adversarial samples.

Disclosed herein are the details of the proposed approach along with a detailing of extensive experiments utilized to demonstrate the performance of the described novel approach.

Early studies reporting that the neural networks can be easily fooled showed that noise-like images may be produced to cause a network to classify them as certain known classes with high confidence. This suggests that the CNNs used in the experiments did not learn the global structure of the objects in the images.

Most early adversarial attacks were white-box attacks. Fast Gradient Sign Method (FGSM) is such an example, which generates adversarial images by adding the sign of the gradient to the original images. Another white-box attack, DeepFool adds less perturbations to the original images as compared to FGSM, based on linearization of the target network. An optimization-based approach known as Carlini-Wagner (C&W) attack is one of the strongest white-box attacks in the literature.

Having the knowledge of the architecture and gradients of the targeted network is a strong assumption, and thus black-box approaches are often more appealing to attackers. A black-box approach may make use of a substitute model to generate the adversarial images, which are then used to fool the target network. This is often the basic strategy for most black-box attacks. Prior solutions presented another way of generating adversarial examples that are robust to certain transformation and degradation. For instance, Generative Adversarial Perturbations (GAP) uses a neural network to generate the perturbations that are added to the input image to form adversarial images. There exist some other recent attack methods that promise to fail many deep networks.

With the adversarial attacks strengthened, there is a need to design defenses that can make the networks robust to the fooling and adversarial images. One of the simplest strategies is to use adversarial images along with original images to retrain the network. A previous solution presented a strong defense strategy known as defensive distillation. In this strategy, the knowledge from a deep neural network was used for training another deep network. This way the network was more robust to the perturbations. While these mechanisms can defend simpler attacks like FGSM, they cannot defend stronger attacks like C&W attack.

There are also defenses that do not rely on revising and/or updating the network but rather through transforming the input images, with the hope of getting rid of the added perturbations in adversarial images. A prior solution presented an approach based on retraining the network on transformed images (JPEG compression, total variance minimization, image quilting, bit depth reduction) to make the networks robust. Another prior solution proposed another input transformation-based approach which uses random resizing and padding on the input images at the test time. Other defense strategies have been proposed recently to make the networks robust to different types of adversarial attacks. Yet, the main issue is that they will fail if the attacker knows the defense strategy. The novel approach and methodologies as set forth herein overcome the shortcoming of existing techniques.

Proposed Methodology: Ortho-K Defender—Provided below is a discussion on an intuitive understanding of why adversarial examples exist, followed by the proposed defense mechanism, Ortho-K Defender, which includes adding a defense layer of orthogonal kernels at the front-end of a given network. Lastly, discussion is provided regarding how the number of orthogonal kernels in the defense layer is determined.

Understanding Adversarial Examples—Most successful deep networks in the literature are over-parameterized, e.g., with tens of millions of weights trained on (typically) a much smaller number of samples. This suggests that attackers have a lot of room to exploit in producing small perturbations whose effects then become amplified with the depth of the network and eventually leads to misbehavior of the network. The over-parameterization of the network with a relatively small training set may also lead to an incomplete exploration of all the parameters, and thus the network can be baffled if the adversarial samples take advantage of unexplored parameters to change their behavior in comparison to the case with original images.

FIG. 1 depicts the decision subspace in 2-D for LeNet-5 trained with the MNIST images and the decision boundaries, in accordance with described embodiments. As shown here, the decision subspace in 2-D for LeNet-5 trained with the MNIST images and the decision boundaries (black dash lines). Note that the decision boundary for each class is well defined. However, the area for each category remains unbounded since the network focuses on achieving good classification performance on the original images only, and no consideration was given to anticipate potential adversarial examples. Now, for example, consider Digit-2 (refer to the shaded dots identified as Digit-2 at element 116); the clean samples are tightly clustered in the sub-region $R_t$ (refer to element 115 within the shaded region) but the sub-region $R_t^c$ at element 120 remains unexplored and unbounded (see extended section identified by element 120 extending beyond the bounding line at element 130). Any sample that appears in R will be classified as Digit-2 (element 116) with high confidence even if visually some such samples (e.g., triangles at element 110 in the top-right corner) will unlikely to resemble Digit-2. This suggests that if R can be bounded (e.g., by the intersecting dashed line at element 130), it may help the network to discern adversarial samples (element 110).

Further depicted by FIG. 1 is an illustration of the decision boundaries of LeNet-5 network for MNIST dataset in 2-D. Each digit class is depicted by either a different shape and/or shade. Note that the area between the decision boundaries remains unbounded on the top for all the classes.

In practice, since an over-parameterized network can learn many different sets of parameters, each giving equally good accuracy in classifying the given data, one cannot rely on such intuitive analysis to discover a fixed constraint on the decision region (refer again to the bounding line at element 130 of FIG. 1). Rather, the constraint should be learned dynamically together with the network parameters.

Ortho-K Defender: The Technique—Based on the above discussion, the disclosed methodology adds a convolutional layer at the beginning of the network with an orthogonality constraint on the kernels. The objective is to employs such a constraint to ultimately bound the learned representation of the inputs so as to help limit the space an attacker may potentially exploit in producing adversarial data. Definitions for the key components of the strategy are first presented followed by a more detailed description of the novel approach.

Definition: Orthogonal Set—A set $S_K$ of kernels is an orthogonal set if all the kernels it contains are orthogonal kernels. Kernel $k_i$ and kernel $k_j$ are orthogonal, if the dot product of their vectorized version, $k_i^v$ and $k_j^v$, is 0.

Definition: Defense Layer—A convolutional layer is a defense layer if its kernels are drawn from an orthogonal set $S_K$.

Figure 2:
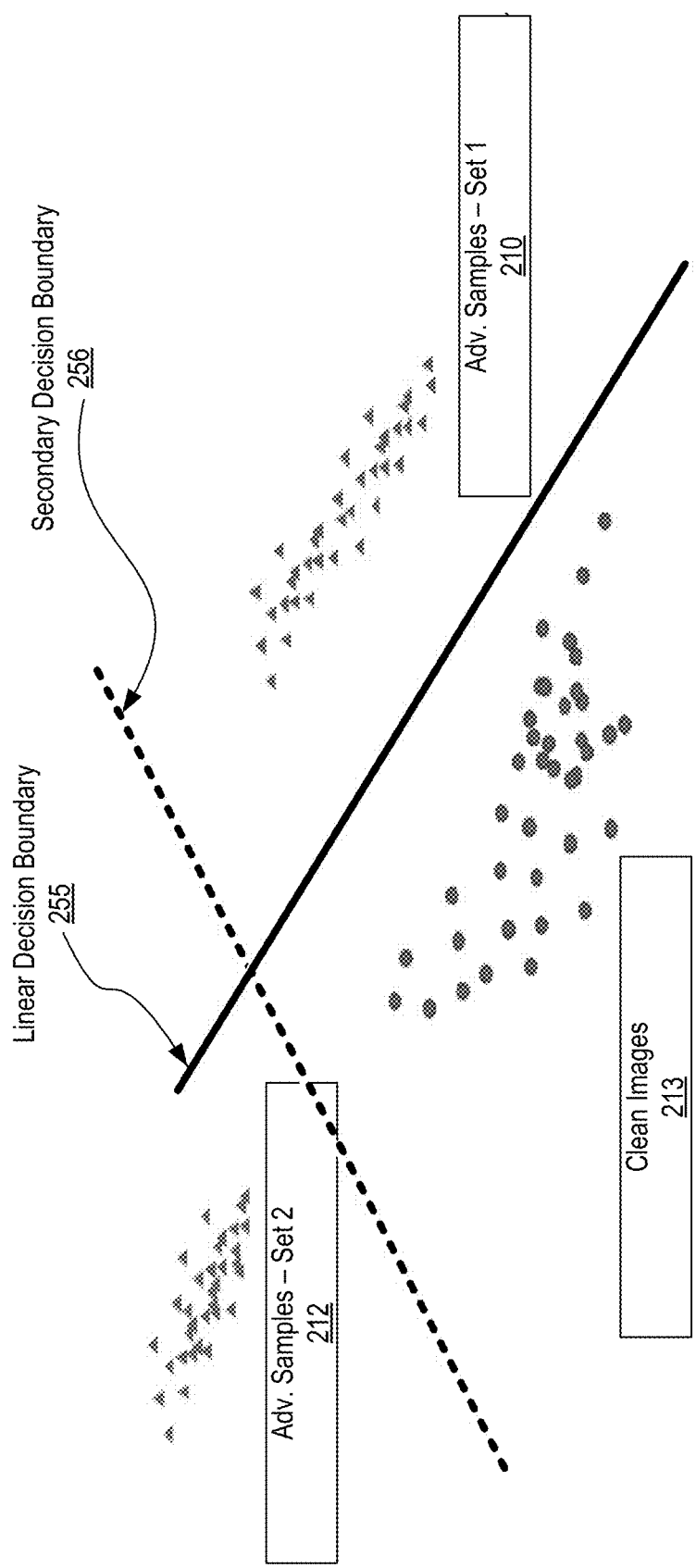
FIG. 2 depicts an illustration of orthogonal kernels in robust networks, in accordance with described embodiments.

FIG. 2 depicts an illustration of orthogonal kernels in robust networks, in accordance with described embodiments. As depicted here, the orthogonal kernels can result in robust networks that can resist adversarial examples with an example of a single-layer linear network.

To illustrate how the orthogonal kernels help in defending adversarial examples, consider a single class from a multi-class classification task as shown in FIG. 2. Without loss of generality, the classifier is assumed to have only one linear layer, which can be easily extended to multi-layer networks. The v–SVM can be applied to obtain a linear decision boundary 255 (solid black line). This decision boundary can definitely defend some adversarial examples (refer to adversarial samples at set 1 (dark triangles on the right hand side identified by element 210). However, the classifier will be fooled by another set of adversarial samples given by Set 2 (light triangles on the left hand side identified by element 212). Therefore, an additional decision boundary is required to avoid such adversarial examples. In this illustration, adding another boundary (refer to the dashed black line identified as secondary decision boundary at element 256) that is orthogonal to the given decision plane can help. In general, while there may be different ways of introducing this additional boundary, employing the orthogonality constraint will yield the least number of additional boundaries, which alleviates the risk of over-fitting.

While the orthogonality constraint may be applied to the kernels of any convolutional layer of a network as a defense strategy, the described embodiments introduce one additional defense layer as a front-end of a given network, keeping the original architecture unchanged otherwise. This helps to achieve simplicity in the implementation and analysis of the defense. Embodiments therefore operate to secure the (updated) network from adversarial examples even if the attacker has complete access to the network architecture and the parameters, except that there remains much freedom in sampling and shuffling the kernels of the defense layer in generating a new version of the network. Maintaining the performance of the network on the original classification task is further necessary. Therefore, disclosed herein is a unique learning technique that facilitates the discovery of the defense kernels having the following desired property: any selection/sampling of the kernels and its permutation will result in a network with (nearly) the same classification performance as the original network. As such, any attack that is optimized to a particular instance of the defense layer (such as a specially optimized white-box attack) can nevertheless be defeated by re-sampling and permutating a new instance of the kernels. Such an embodiment is described in greater detail below.

Figure 3:
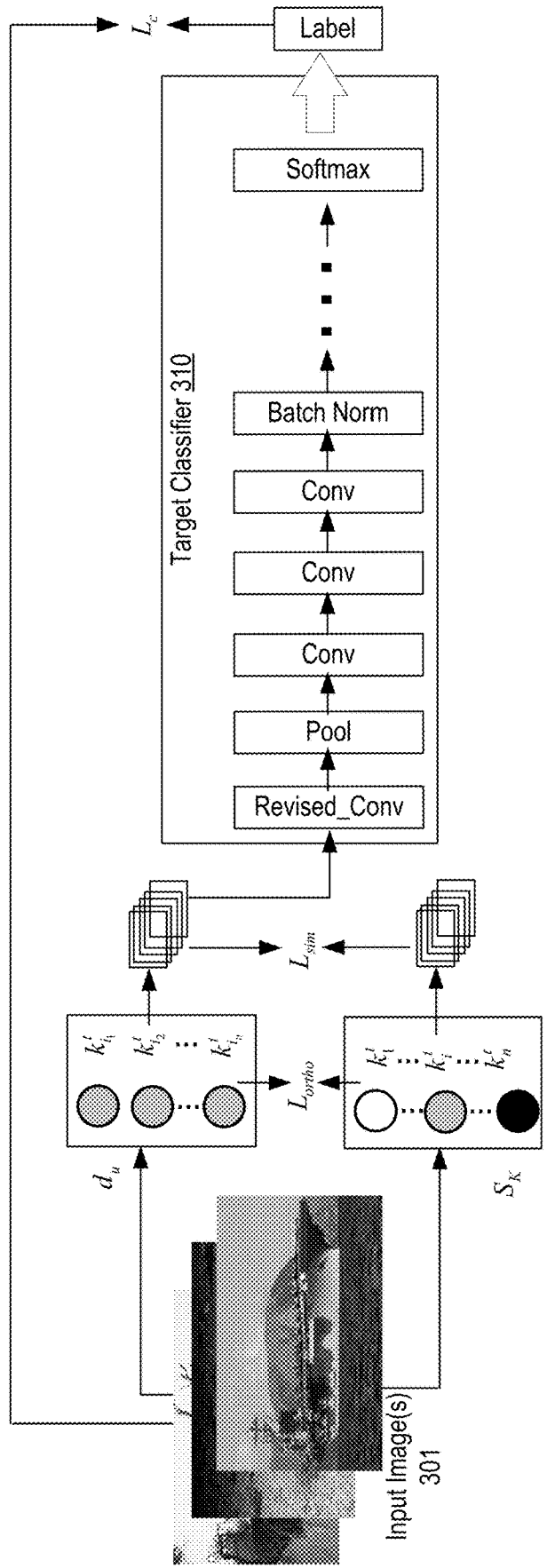
FIG. 3 depicts the framework of Ortho-K Defender strategy added to a conventional CNN, in accordance with described embodiments.
Figure 9A:
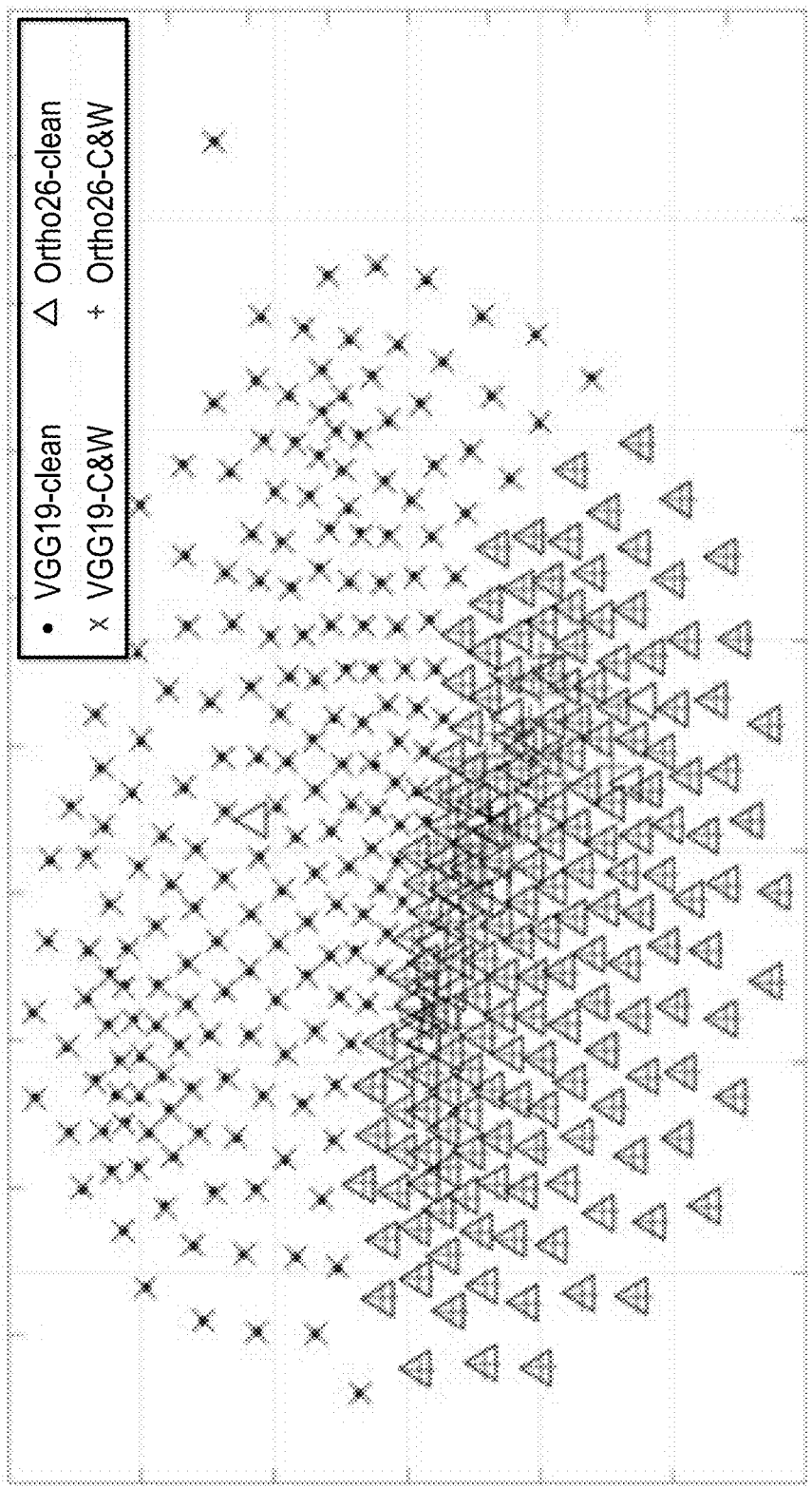
FIGS. 9A, 9B, 9C, and 9D depict visualizations of learned features in 2-D for various layers of VGG-19 and Ortho-26 VGG-19 network trained on the CIFAR-10 dataset, in accordance with described embodiments.
Figure 9B:
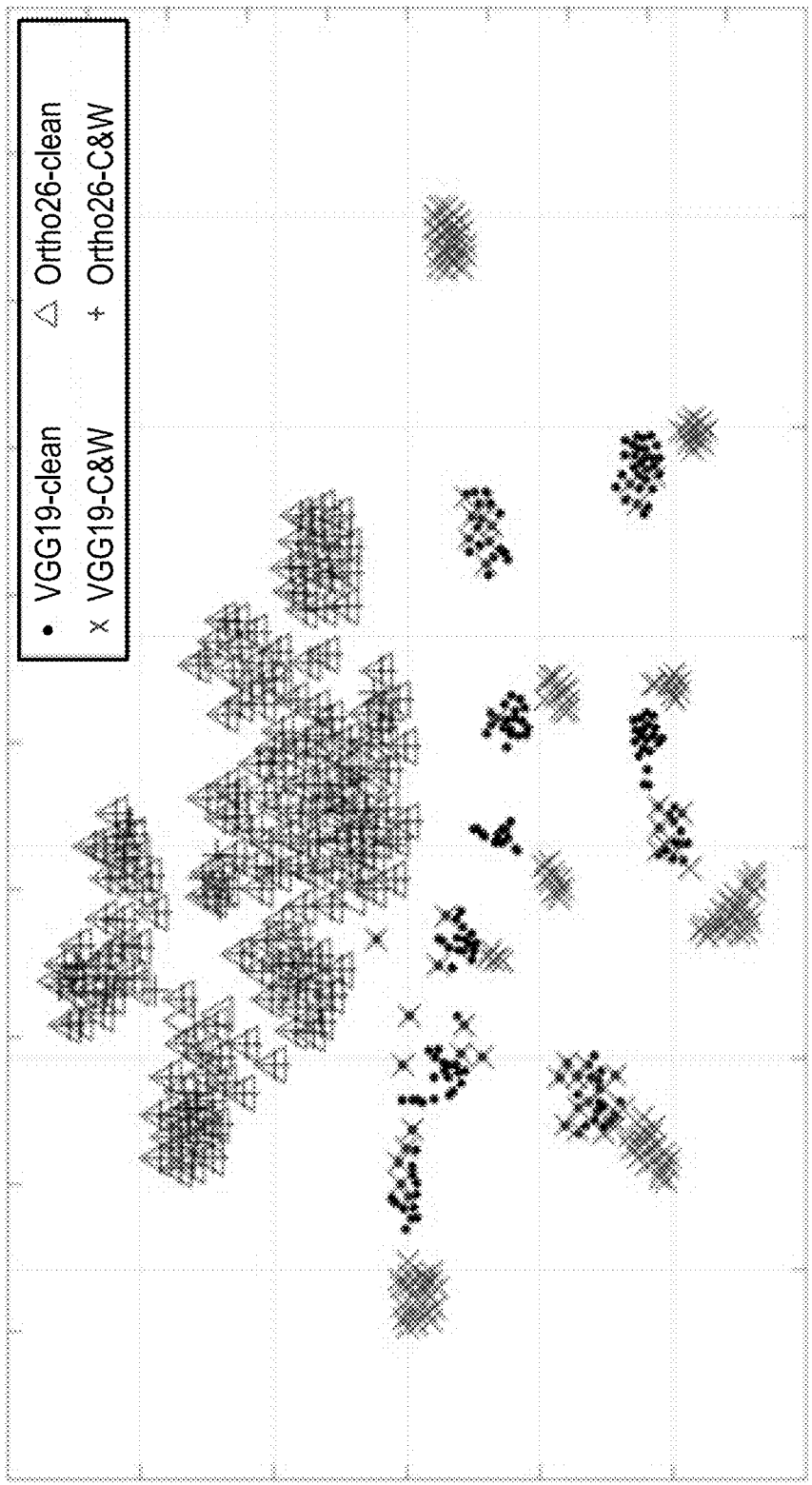
Figure 9C:
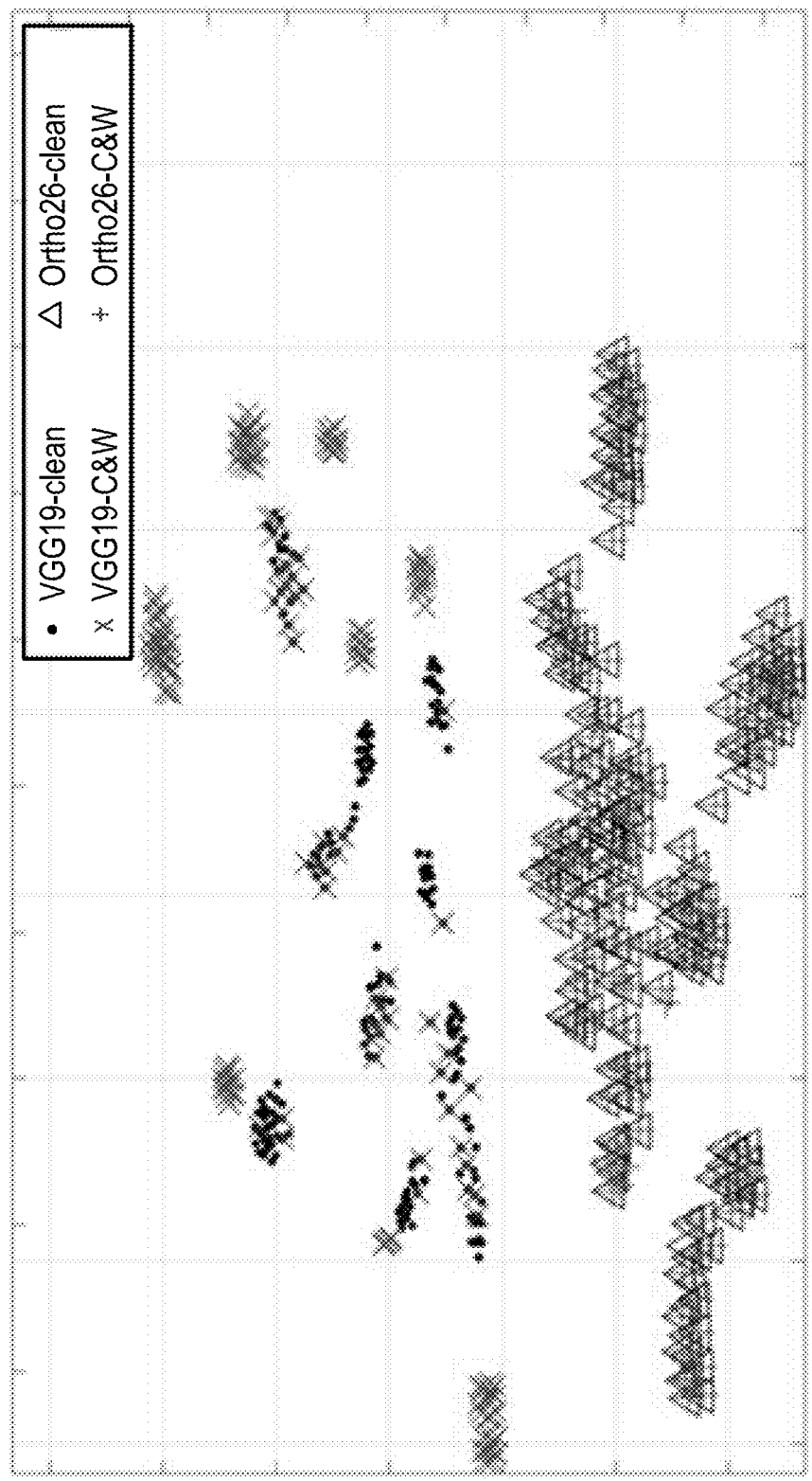
Figure 9D:
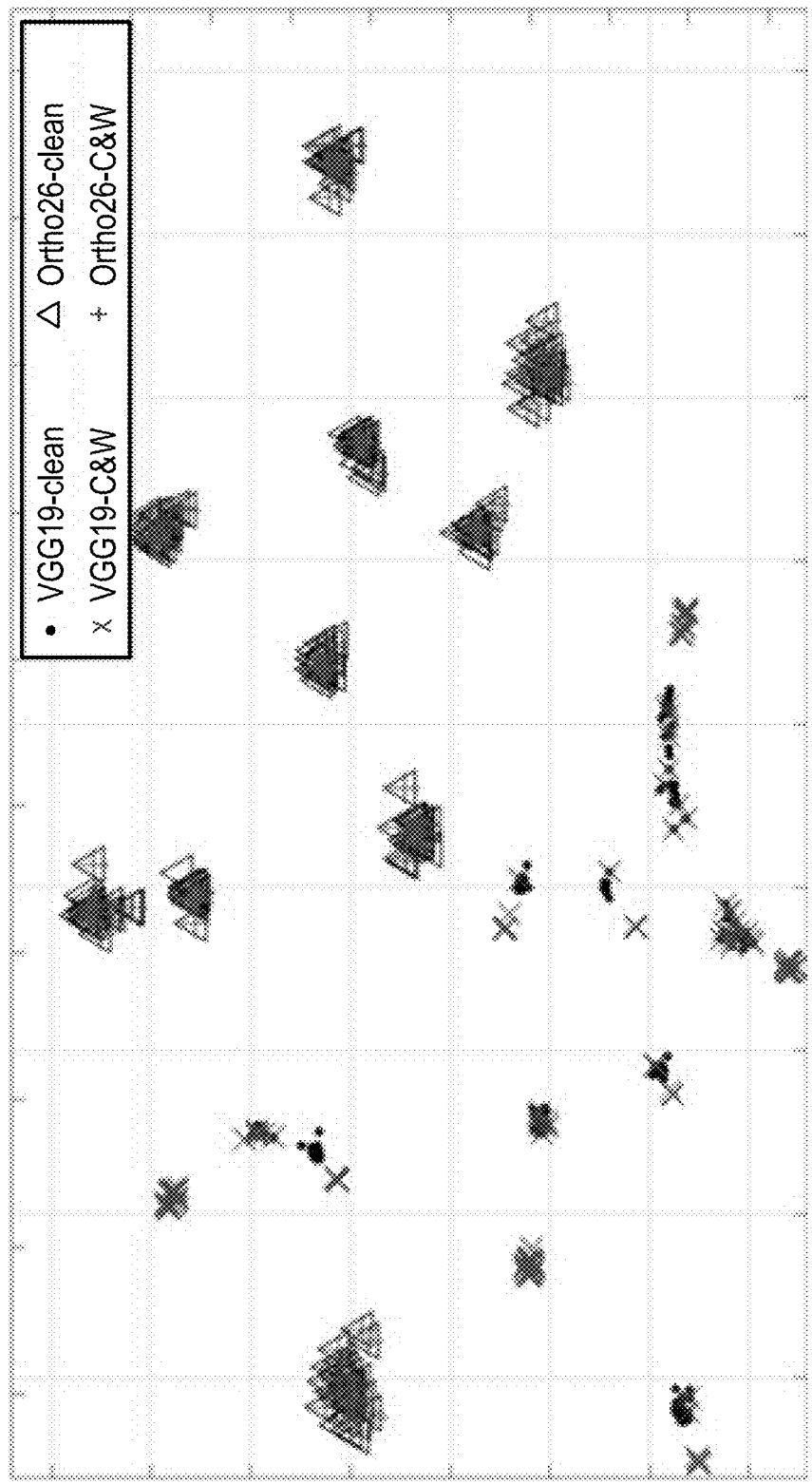

FIG. 3 depicts the framework of Ortho-K Defender strategy added to a conventional CNN, in accordance with described embodiments. As shown here, a framework for the proposed Ortho-K Defender Strategy when added to a conventional CNN, in which the input image (see element 310) is first fed to the defense layer and the output of the defense layer is then fed to the first layer of a given network (revised CNN), whose input layer is modified to accommodate the modified number of inputs channels. The parameter $d_u$ is the defense layer and $S_K$ is the orthogonal set from which the kernels for the defense layer are drawn (the set of all the orthogonal kernels). Only $d_u$ is connected to the network. For every iteration t, the order of kernels will change in $S_K$, and a randomly picked kernel from $S_K$ is duplicated N−1 times in $d_u$ where N−1 is the number of orthogonal kernels.

During the training phase, both the value and order of the kernels $d_u$ and $S_K$ are updated. The defense layer $d_u$ is formed by randomly picking one kernel $k_i^t$ from $S_K$, and duplicating it N−1 times where N−1 is the number of kernels in the defense layer. To ensure the kernels are properly learned together with the original network, an orthogonality loss and a similarity loss are introduced, as elaborated below.

The orthogonality loss is defined in Equation 1:

$$L_{ortho} = \sum_{j=1, j \neq 1}^{N-1} \frac{k_i^{t^T} k_j^t}{\|k_i^t\| \|k_j^t\|}$$

where t represents time (iteration), $k_i^t$ is the kernel seed in the defense layer $d_u$, and $k_i^t$, $j \in [1, N-1]$ is the kernel in $S_K$. Cosine similarity is utilized to measure the orthogonality.

Aiming at obtaining the same feature maps from the defense layer for the same input regardless of the kernel picked from $S_K$ at time t, the similarity loss is introduced, which is defined in Equation 2:

$$L_{sim} \|d_u^{k_i^t}(x) - d_u^{S_K}(x)\|_2$$

where t represents time, $d_u^{S_K}(x)$ is the output from the defense layer $d_u$ with input x, and $d_u^{S_K}(x)$ is the output from the defense layer. Minimizing this loss reduces any potential negative effect of the additional defense layer on the original classification task (e.g., as performed by the target classifier at element 310).

For the classification task, the categorical cross entropy loss is used as defined in Equation 3:

$$L_c = -\sum_{m=1}^{M} Z_m \log\left(\frac{e^{y_m}}{\sum_j^M e^{y_j}}\right),$$

where M represents the total number of classes, $Z_m$ is the true label, and $y_m$ is the label predicted by the network. Thus, the overall loss function L of the proposed approach is defined using Equation 4:

$$L = \alpha L_{ortho} + \beta L_{sim} + \gamma L_c$$

where $\alpha$, $\beta$, $\gamma$ are the parameters which control how much each loss term contributes to the total loss. With this, the network is then trained using Algorithm 1.

FIG. 4 depicts Algorithm 1 used to train the network, in accordance with described embodiments.

In Algorithm 1, at any given time t, only the picked $k_i^t$ is updated. However, every kernel is picked at some point of time and updated in the entire training process. This innovative training strategy ensures that the learned kernels have the desired property without the requirement of learning all kernels and their permutations simultaneously, which is impractical to implement in practice for large kernel sizes. Also, this training strategy was experimentally demonstrated to give rise to faster convergence than learning all the kernels at the same time. After every iteration, the experiment validates on the validation set using the entire orthogonal set $S_K$ with any shuffled order to ensure that all the kernels are learnt properly and approximately similar performance to that of the original network is achieved on the original images.

FIG. 5 depicts Algorithm 2 used to deploy the network for classification, in accordance with described embodiments.

Upon the completion of training, the network may be deployed for classification, via Algorithm 2, which essentially assembles a particular network from the set of learned kernels (and their particular arrangement). As experimentally demonstrated, an attacker cannot have a good success rate in attacking the network even with access to the full set of the learned kernels, especially when the classifier does not let the attacker know the exact kernels and their arrangement used in assembling the particular network.

Determining the Number of Kernels—Intuitively, the more orthogonal kernels in the orthogonal set, the higher the performance of the defense strategy. However, the number of kernels in the defense layer is bounded by the kernel structure itself, as shown below.

Proposition—If the size of each kernel is W×H×C where the W, H, and C are the width, height and channels of the kernel respectively, then the maximum number of the orthogonal kernels in the set $S_K$ is N−1, where N=W×H×C.

In a N-dimensional coordinate system, at most N vectors are orthogonal to each other. Due to the constraint of similarity of the output of the defense layer regardless of the kernels used in the defense layer, only N−1 degree of freedom are permissible. Hence, it is the upper bound on the number of kernels used in the defense layer.

In practice, the size of a convolutional kernel is small which suggests that the size of the orthogonal set $S_K$ is also small. However, the various ways to select the kernels and their permutations yield a prohibitively huge number. Thus, it is unrealistic for the attacker to conduct an exhaustive search over the orthogonal set $S_K$ to find the exact kernels and their permutation used.

Experiments—In adversarial tasks, the metric used for measuring performance is called fooling rate which is defined as:

$$F_{rate} = \frac{\sum_{m=0}^{M} y_m \neq Z_m}{N},$$

where $y_m$ is the predicted label and $Z_m$ is the correct label, M is the total number of input samples and N is the number of correctly predicted images in the test set.

FIG. 6 depicts Table 1 (element 675) which shows test accuracy of networks with and without Ortho-K defense, in accordance with described embodiments.

Table 1 further depicts the test accuracy of the original network (second column) and the one with Ortho-K defense added to it (last column) on clean images. For CIFAR-10 dataset, two versions of Ortho-K Defender are presented, one with 26 kernels and other with 74 kernels in the defense layer.

Only correctly predicted images were considered so as to exclude the misclassification rate from the fooling rate. The lower the value of the fooling rate, the stronger the defense is for defending against adversarial examples.

Since it is necessary to ensure that the defense strategy not only secures the network from the adversarial images but also achieves good performance on clean images (refer also to the shaded dots identified as clean images at element 213 of FIG. 2), the test accuracy of the original network is listed along with the one with added defense layer for each of the MNIST, CIFAR-10 and CIFAR-100 datasets in Table 1 (element 675). The performance of the network with added defense is slightly lower than the original network, but the difference is minute and very close to the one achieved by the original network.

Four well-established attacks are utilized for the experiments, specifically FGSM, DeepFool, C&W and GAP, so as to test the integrated defense mechanism. Two values for fooling rate are reported for Ortho-K Defender strategy—the worst-case fooling rate and the average case fooling rate. The worst-case fooling rate is the one when the attacker knows exactly which and how the kernels are arranged in the defense layer for defending the adversarial samples. On the other hand, the average-case is when the selection of kernels and their arrangement do not match the one used in the defense phase. The average-case is more realistic for real-world scenarios.

For Ortho-K Defender, since there can be numerous ways in which the orthogonal kernels are selected and arranged, a number of such combinations were investigated, as shown in Table 3 (element 875). Ortho-K (1) represents the defense layer formed by randomly picking one kernel from $S_K$, and duplicating it in the rest of the layer. Ortho-K (2) represents the defense layer formed by picking two kernels randomly from $S_K$ and duplicating them in the rest of the layer. As the attacker has full access to $S_K$, they can try bypassing the described strategy by performing different operations on the kernels instead of using the original kernels while designing the attack. To show that the defense works for such possibilities as well, a set of results are further presented where the attacks use the average of one/two randomly picked kernels from $S_K$ to generate the adversarial examples. These combinations are represented by Ortho-K (1+1), Ortho-K (2+1) and Ortho-K (2+2).

The last three combinations are applicable to white-box attacks only since the black-box attacks are designed without any knowledge of the gradients of the network. So, these kinds of manipulations of the gradients will not affect the black-box attack strategies.

MNIST Results—Starting with the MNIST dataset and Lenet-5 network, as it has been extensively used for evaluating adversarial attacks and defenses, a defense layer consisting of an orthogonal set of 24 kernels is added to Lenet-5 network. For the original Lenet-5, all the white-box attackers can easily fool it with above 90% fooling rate, and the blackbox attacker can achieve 80.2% fooling rate. For Ortho-K Defender, regardless of which kernel combination the attack uses, the fooling ratio reduces dramatically. Note that even in the worst case, the attack experiences difficulty in baffling the network with high fooling rate. A similar trend is observed for other networks and datasets. This indicates that the orthogonality constraint can cast the adversarial examples to the subspace where the network learns to capture the original images, thus making it difficult for the attack to fool the network.

CIFAR-10 & CIFAR-100 Results—The VGG-19 network was used for classifying CIFAR-10 and CIFAR-100 datasets. Similar to MNIST experiments, several combinations of the orthogonal kernels are examined. For CIFAR-10, two orthogonal sets are considered. One contains 26 kernels (Ortho-26) and the other has 74 kernels (Ortho-74). Both configurations are immune to the attackers, especially strong attacks like DeepFool and C&W. However, it is observed that the Ortho-26 performs slightly better than that of Ortho-74 in terms of lower fooling rate for the same attack configuration. This implies that the number of kernels in the defense layer and the dimension of the input should be comparable. Else, it will result in unexplored parameters in the defense layer which the attackers can exploit easily. The CIFAR-100 results show that Ortho-K Defender works effectively for a dataset with a large number of classes as well.

ImageNet—To further demonstrate the capability of Ortho-K Defender, experiments were conducted using a subset of ImageNet dataset. It contains 30 training images and 10 testing images for each of the 1000 classes. The original network used is ResNet-50 achieving a Top-1 accuracy of 71% on the subset. The defense layer was tuned with 74 kernels along with the first convolutional layer and last fully connected layer. All other layers remain fixed. A 69.2% Top-1 test set accuracy on the subset was obtained, which is close to the one achieved by the original network. When the defense equipped network is tested against FGSM, the initial fooling rate reduced from 65% to 55% (worst case) and 32% (average case). For C&W attack, the initial fooling rate reduced from 81.25% to 44.45% (worst case) and 36.78% (average case). These results indicate that Ortho-K Defender can be easily extended to datasets with larger image size.

Comparisons With Other Defense Techniques—To showcase that the existing defenses can be easily bypassed if the defense strategy is known by the attacker, Ortho-K Defender was compared with such defense approaches namely, retraining, Bit-Depth-Reduction and JPEG.

FIG. 7 depicts Table 2 (element 775) which shows fooling rate for different attacks after various defenses are applied on the CIFAR-10 dataset, in accordance with described embodiments.

Keeping the configuration of the attacks same, results show that except the network equipped with Ortho-K Defender, all the defense baselines have difficulty in recognizing the adversarial samples indicated by high fooling rate. This is due to the fact that the attackers can use the new gradients of the defense-equipped network to generate new adversarial samples, and in turn, fool the updated network again.

Table 2 of FIG. 7 further depicts fooling rate for different attacks after the various defenses are applied on CIFAR-10 Dataset. The attack algorithm is given full access to the defense strategy applied. An equal number of original and adversarial images are used for retraining. Due to different combinations of the kernels in Ortho-K Defender strategy, its results are presented in Table 3 of FIG. 8 (element 875).

FIG. 8 depicts Table 3 which shows fooling rate of different attacks on the original network and variations of Ortho-K Defender, in accordance with described embodiments.

Table 3 depicts the fooling rate of different attacks on the original network and the variations of Ortho-K Defender. The attack algorithm has full access to the defense strategy. (1) and (2) mean the defense layer consists of one and two randomly picked kernel respectively; (1+1) refers to constructing the adversarial samples using the gradients from two sets of defense layer parameters, and each set consists of one randomly selected kernel. Similarly, the variation of (1+2) and (2+2) is provided for constructing adversarial samples. The last three combinations are applicable to white-box attacks only.

FIGS. 9A, 9B, 9C, and 9D depict visualizations of learned features in 2-D for various layers of VGG-19 and Ortho-26 VGG-19 network trained on the CIFAR-10 dataset, in accordance with described embodiments.

Visualization of the learned features in 2-D for the first convolutional layer (first column), intermediate layers (second and third column) and the layer before softmax (last column) of VGG-19 and Ortho-26 VGG-19 network trained on the CIFAR-10 dataset. The adversarial images are generated using C&W algorithm.

Figure 10A:
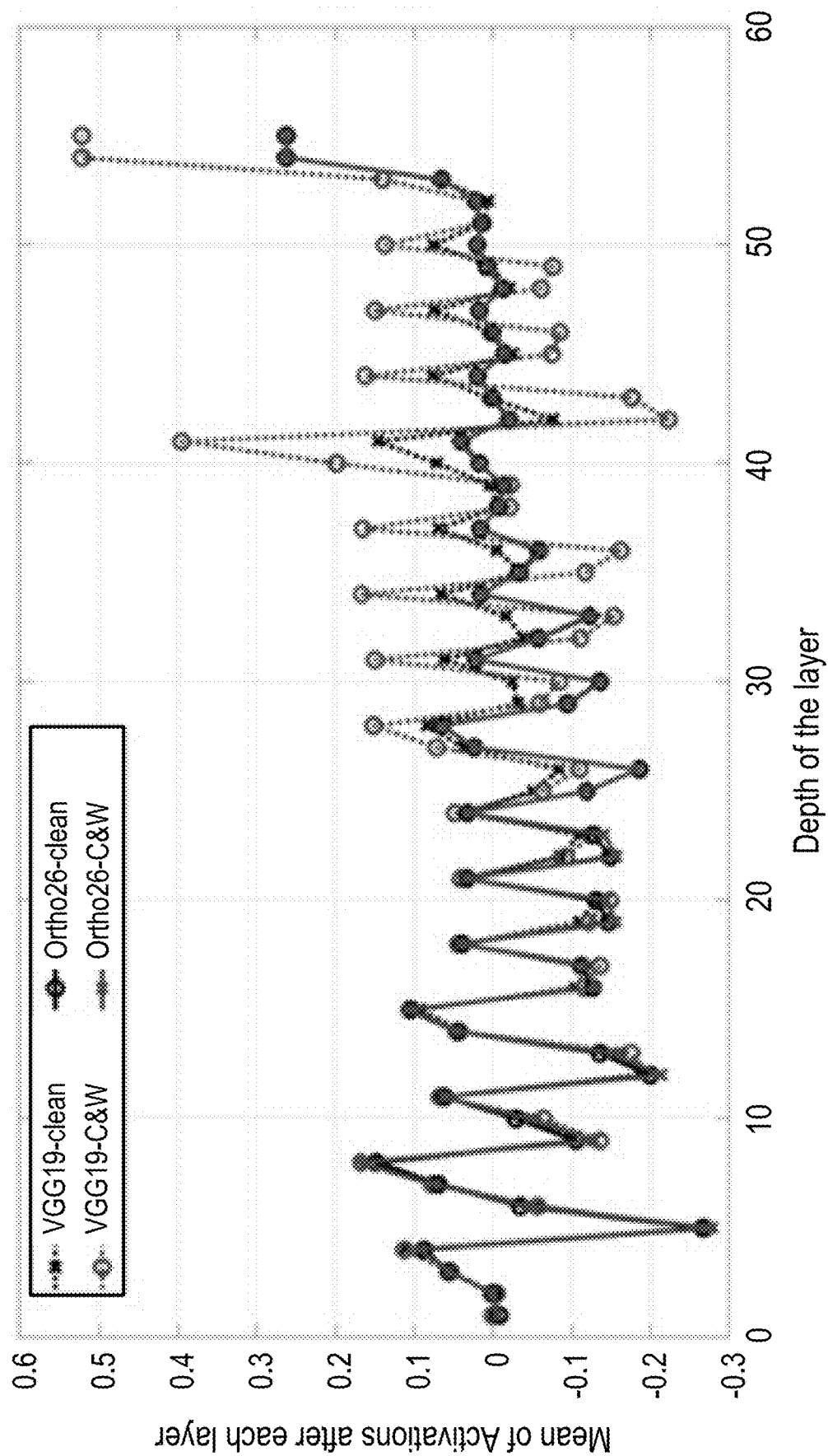
FIGS. 10A and 10B depict the mean and standard deviations of each layer's activation values for both VGG-19 and Ortho-26-VGG-19 on the CIFAR-10 dataset, in accordance with described embodiments.
Figure 10B:
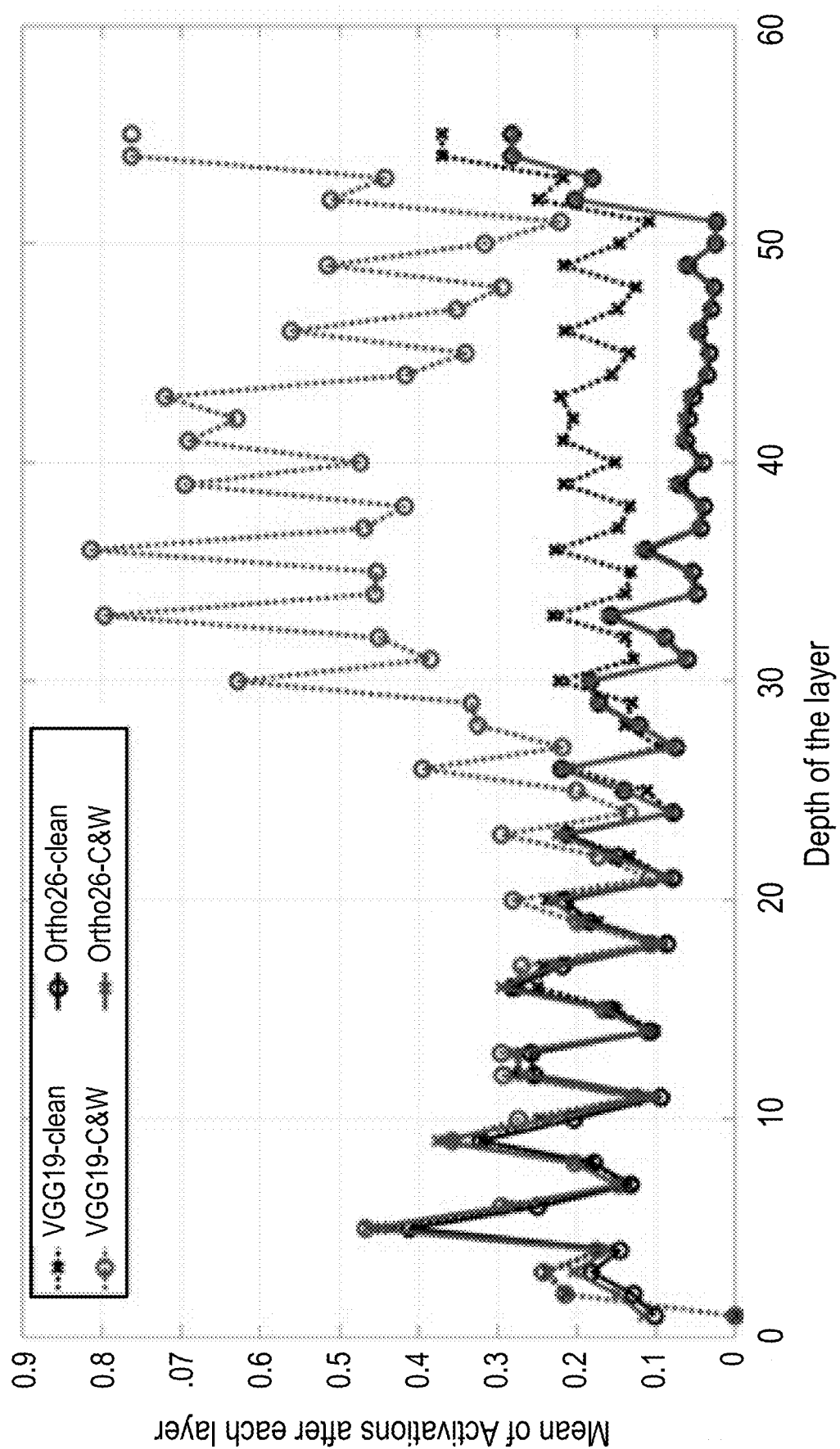

FIGS. 10A and 10B depict the mean and standard deviations of each layer's activation values for both VGG-19 and Ortho-26-VGG-19 on the CIFAR-10 dataset, in accordance with described embodiments.

The mean (left) and standard deviation (right) of each layer's activation values for both VGG-19 and Ortho-26-VGG-19 on the CIFAR-10 dataset. For adversarial examples (generated by C&W attack), the values are shown by shaded dashed line and shaded solid line for VGG-19 and Ortho-26-VGG-19 respectively. Similarly, for the clean images they are shown by a black dash line and a black solid line for VGG-19 and Ortho-26-VGG-19 respectively.

Further described below is how the disclosed model defends adversarial samples from two different perspectives. The learning protocol of the model is first examined to discover potential factors leading to the effectiveness and robustness and verify the assumption by mathematical deduction. Next, statistical tools are used to analyze the distributions of the feature maps obtained after different layers of the original network and Ortho-K Defender network to further verify the proposed assumptions.

When the Ortho-K Defender is trained properly and Equation 4 reaches its optimal value, the defense layer satisfies the following:

Proposition—Assuming that (1) the kernels k in the defense layer are orthogonal to each other ($k_i^T k_j^t = 0$), and (2) the mapping of each k is almost the same for any given input $x(k_i^{rT} x \approx k_i^{tT} x)$ then the defense layer will cast the input close to zero-vector.

Proof—Given the two conditions, it is thus true that:

$$k_i^T x \approx k$$
$$k_i^{rT} x => k_i^t k_i^{rT} x \approx k_i^t k_i^{tT} x = 0 => k_i^t k_i^{tT} x \approx 0 => x^T k_i^t k_i^{tT} x \approx 0 => \|k_i^{tT} x\| \approx 0.$$

The perturbation added to the clean image in order to turn it into an adversarial image is often of very low magnitude in order to satisfy the constraint of both the images being aesthetically similar to each other. Thus, when these images are mapped to zero-vector-like features, the effect of most of the perturbations vanishes. In other words, the defense layer limits the subspace the attacks can exploit. This is verified by FIGS. 9A, 9B, 9C, and 9D, which visualizes how a typical batch of clean images and their corresponding adversarial images behave as the inputs move deeper in Ortho-K Defender and original network.

As depicted at the series of FIGS. 9A, 9B, 9C, and 9D, the learnt features are visualized in 2-D after the first convolutional layer, two intermediate layers and the last layer before softmax for both the networks. The features for the clean and adversarial images after the first convolutional layer are overlapped for both Ortho-K Defender and original network as the effect of perturbation is subtle.

As the input goes deeper in the network, it is observed that the features of the adversarial images (shaded cross) are gradually cast to a different subspace compared to the features of the clean images (black dot) in case of the original network. This phenomenon depicts the change in behavior of the adversarial images from that of the clean images. Moreover, the original network cannot handle unexplored subspace other than the clean image subspace and that is how the original model gets easily attacked. On the contrary, the adversarial examples (shaded plus symbol) and the clean images (black triangle) behave similarly in case of an Ortho-K Defender even at the last layer, which is the most affected layer by adversarial images.

Therefore, the attacks fail to deceive this defense-equipped network. This aforesaid observation confirms that Ortho-K Defender has the capability of narrowing the unexplored space, of which the attackers may take advantage. A similar conclusion can be drawn from FIGS. 10A and 10B, which shows how the mean and standard deviation of the activation values change as the input moves deeper into the network.

It is clear that as the input moves deeper into the original network (dash line), the adversarial samples and clean samples exhibit dissimilar behavior and eventually land in different subspaces. On the other hand, the clean and adversarial samples behave similarly for the network equipped without defense strategy (solid line).

Figure 11:
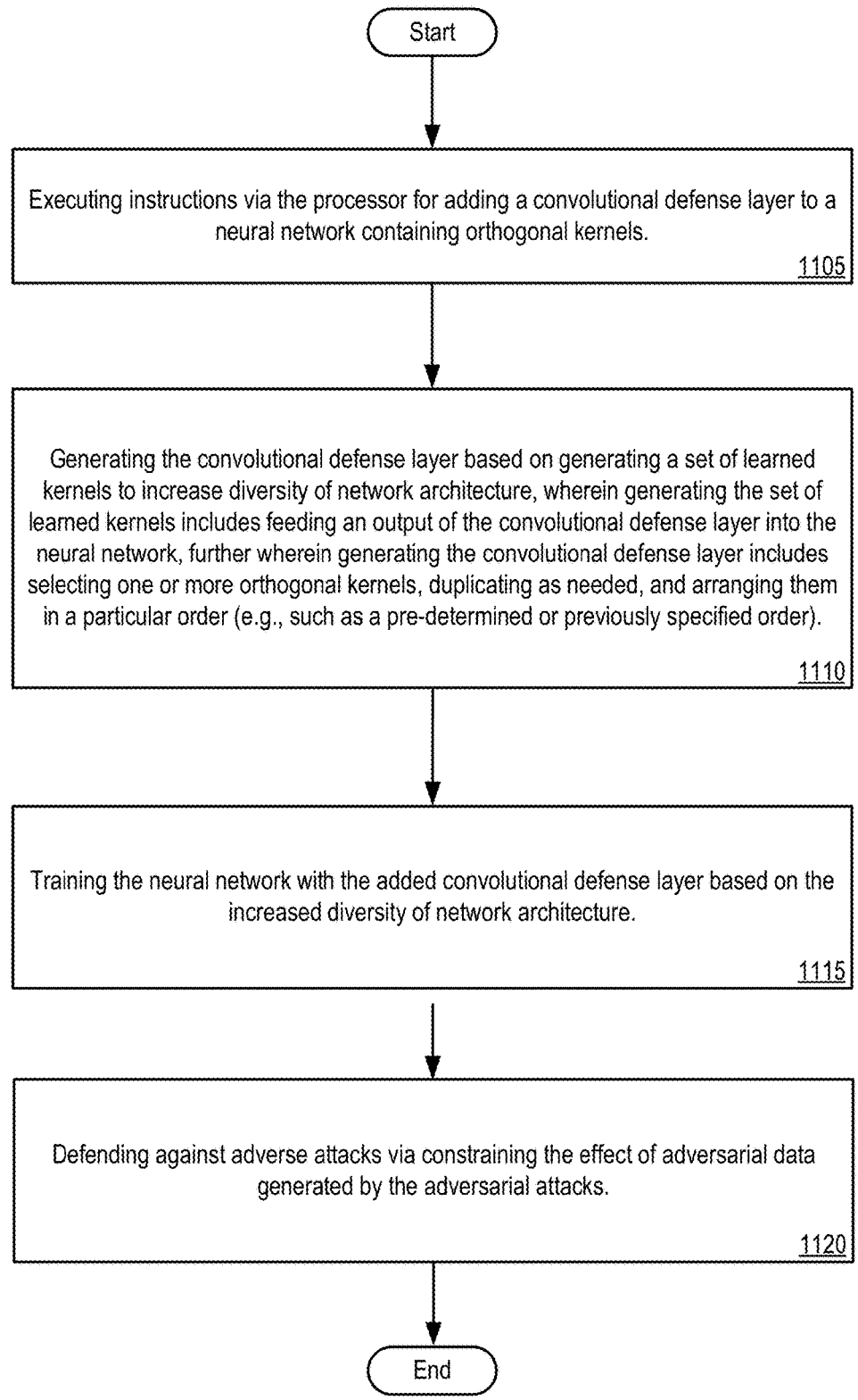
FIG. 11 depicts a flow diagram illustrating a method for a novel approach for deep-learning-based systems to defend against adversarial attacks, in accordance with disclosed embodiments.

FIG. 11 depicts a flow diagram illustrating a method for a novel approach for deep-learning-based systems to defend against adversarial attacks on neural networks, in accordance with disclosed embodiments. Method 1100 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. Some of the blocks and/or operations listed below are optional in accordance with certain embodiments. The numbering of the blocks presented is for the sake of clarity and is not intended to prescribe an order of operations in which the various blocks must occur.

With reference to the method 1100 depicted at FIG. 11, there is a method performed by a system specially configured to defend against adversarial attacks on neural networks. Such a system may be configured with at least a processor and a memory to execute specialized instructions which cause the system to perform the following operations:

At block 1105, processing logic adds a convolutional defense layer to a neural network containing orthogonal kernels.

At block 1110, processing logic generates the convolutional defense layer based on generating a set of learned kernels to increase diversity of network architecture, in which generating the set of learned kernels includes feeding an output of the convolutional defense layer into the neural network, further in which generating the convolutional defense layer includes selecting one or more orthogonal kernels, and arranging the one or more selected orthogonal kernels in a specified order.

At block 1115, processing logic trains the neural network with added convolution defense layer using the increased diversity of network architecture.

At block 1120, processing logic defends against adverse attacks via constraining the effect of adversarial data generated by the adversarial attacks.

According to another embodiment of method 1100, the adversarial attacks include one or more of: (i) white-box attacks, and (ii) black-box attacks.

According to another embodiment of method 1100, the convolutional defense layer is added to the front-end of the neural network.

According to another embodiment of method 1100, duplicating the selected orthogonal kernel in the convolutional defense layer is based on duplicating N−1 times, where N−1 represents a total number of orthogonal kernels in the convolutional defense layer.

According to another embodiment of method 1100, the neural network with the convolutional defense layer is further deployed for classification, in which deploying for classification includes assembling a particular neural network based on the set of learned kernels.

According to another embodiment of method 1100, the performance of adversarial attacks is measured by fooling rate:

$$F_{rate} = \frac{\sum_{m=0}^{M} y_m \neq Z_m}{N}.$$

According to another embodiment of method 1100, the set of learned kernels $S_K$ includes a maximum number of orthogonal kernels N−1, where N=W×H×C.

According to another embodiment of method 1100, constraining the effect of adversarial data generated by adversarial attacks includes the convolutional defense layer mapping images of orthogonal kernels to zero-vector-like features in different sub-spaces than adversarial images generated by adversarial attacks.

According to another embodiment of method 1100, the one or more of the selected orthogonal kernels are duplicated before being arranged in a specified order.

According to a particular embodiment, there is a non-transitory computer readable storage medium having instructions stored thereupon that, when executed by a system having at least a processor and a memory therein, the instructions cause the system to perform operations for defending against adversarial attacks on neural networks. According to such an embodiment, executing the instructions causes the system to perform at least the following operations: adding a convolutional defense layer to a neural network containing orthogonal kernels; generating the convolutional defense layer based on generating a set of learned kernels to increase diversity of network architecture, in which generating the set of learned kernels includes feeding an output of the convolutional defense layer into the neural network, further in which generating the convolutional defense layer includes selecting one or more orthogonal kernels, and arranging the one or more selected orthogonal kernels in a specified order; training the neural network with the added convolutional defense layer based on the increased diversity of network architecture; and defending against adverse attacks via constraining the effect of adversarial data generated by the adversarial attacks.

It is therefore described herein, a novel defense mechanism named Ortho-K Defender, which can be applied to typical deep neural networks to become robust to adversarial samples. By introducing orthogonality constraint on the kernels of the defense layer, the defense mechanism manages to cast the adversarial samples to the manifold where the clean samples lie without affecting the performance on the original classification task significantly. Compared to state-of-the-art defense approaches, the defense mechanism manages to defend some of the strongest attacks effectively even if the attacks have complete access to the actually utilized defense strategy. Furthermore, the experiments on various kernel selection strategy show the massive combinations of the orthogonal kernels make the attacker hard to implement an effective attack. Moreover, the attackers have complete access to the chosen model, which is more realistic in real-applications. Thus, the experiments demonstrate the network can be well protected by the proposed method.

Figure 12:
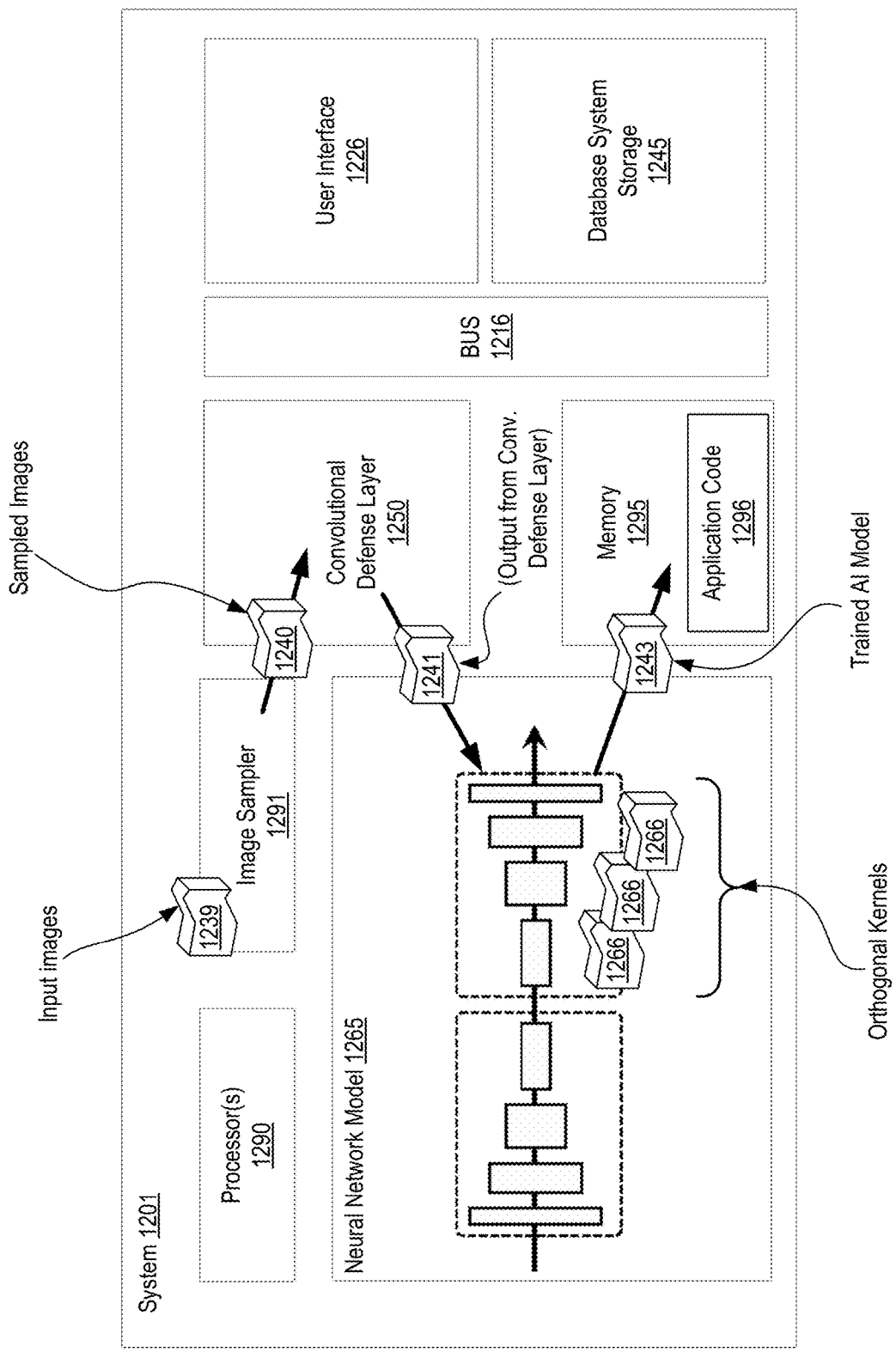
FIG. 12 shows a diagrammatic representation of a system within which embodiments may operate, in accordance with one embodiment.

FIG. 12 shows a diagrammatic representation of a system 1201 within which embodiments may operate, be installed, integrated, or configured. In accordance with one embodiment, there is a system 1201 having at least a processor 1290 and a memory 1295 therein to execute implementing application code 1296. Such a system 1201 may communicatively interface with and cooperatively execute with the benefit of remote systems, such as a user device sending instructions and data, a user device to receive as an output from the system 1201.

According to the depicted embodiment, the system 1201, includes the processor 1290 and the memory 1295 to execute instructions at the system 1201. The system 1201 as depicted here is specifically customized and configured specifically to train a deep model to learn and integrate a defense mechanism into deep-learning-based AI model and system to defend against adversarial attacks, in accordance with disclosed embodiments.

According to a particular embodiment, system 1201 is specifically configured to execute instructions via the processor for defending against adversarial attacks on neural networks by executing the following operations: executing instructions via the processor 1290 for adding a convolutional defense layer 1250 to a neural network 1265 containing orthogonal kernels 1266; generating the convolutional defense layer 1250 based on generating a set of learned kernels to increase diversity of network architecture, wherein generating the set of learned kernels includes feeding an output 1241 of the convolutional defense layer 1250 into the neural network 1265, further wherein generating the convolutional defense layer 1250 includes: selecting one or more orthogonal kernels 1266, and arranging the one or more selected orthogonal kernels 1266 in a specified order; training the neural network 1265 with the added convolutional defense layer 1250 based on the increased diversity of network architecture; and defending against adverse attacks via constraining the effect of adversarial data generated by the adversarial attacks using a trained AI model 1243.

According to another embodiment of the system 1201, a user interface 1226 communicably interfaces with a user client device remote from the system and communicatively interfaces with the system via a public Internet.

Bus 1216 interfaces the various components of the system 1201 amongst each other, with any other peripheral(s) of the system 1201, and with external components such as external network elements, other machines, client devices, cloud computing services, etc. Communications may further include communicating with external devices via a network interface over a LAN, WAN, or the public Internet.

FIG. 13 illustrates a diagrammatic representation of a machine 1301 in the exemplary form of a computer system, in accordance one embodiment, within which a set of instructions, for causing the machine/computer system 1301 to perform any one or more of the methodologies discussed herein, may be executed.

In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1301 includes a processor 1302, a main memory 1304 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1318 (e.g., a persistent storage device including hard disk drives and a persistent database and/or a multi-tenant database implementation), which communicate with each other via a bus 1330. Main memory 1304 includes a Convolutional Neural Network (CNN) 1324 which includes orthogonal kernels, a generated convolutional defense layer 1323, and a trained AI model 1325 for utilization in defending against adversarial attacks in support of the methodologies and techniques described herein. Main memory 1304 and its sub-elements are further operable in conjunction with processing logic 1326 and processor 1302 to perform the methodologies discussed herein.

Processor 1302 represents one or more specialized and specifically configured processing devices such as a microprocessor, central processing unit, or the like. More particularly, the processor 1302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1302 may also be one or more special-purpose processing devices such as an application-specific integrated circuit (ASIC), a field programmable gate array (FPGA), a digital signal processor (DSP), network processor, or the like. Processor 1302 is configured to execute the processing logic 1326 for performing the operations and functionality which is discussed herein.

The computer system 1301 may further include a network interface card 1308. The computer system 1301 also may include a user interface 1310 (such as a video display unit, a liquid crystal display, etc.), an alphanumeric input device 1312 (e.g., a keyboard), a cursor control device 1313 (e.g., a mouse), and a signal generation device 1316 (e.g., an integrated speaker). The computer system 1301 may further include peripheral device 1336 (e.g., wireless or wired communication devices, memory devices, storage devices, audio processing devices, video processing devices, etc.).

The secondary memory 1318 may include a non-transitory machine-readable storage medium or a non-transitory computer readable storage medium or a non-transitory machine-accessible storage medium 1331 on which is stored one or more sets of instructions (e.g., software 1322) embodying any one or more of the methodologies or functions described herein. The software 1322 may also reside, completely or at least partially, within the main memory 1304 and/or within the processor 1302 during execution thereof by the computer system 1301, the main memory 1304 and the processor 1302 also constituting machine-readable storage media. The software 1322 may further be transmitted or received over a network 1320 via the network interface card 1308.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising:
   a memory to store instructions;
   a processor to execute the instructions stored in the memory;
   wherein the system is specially configured to defend against adversarial attacks on neural networks by performing the following operations:
   executing instructions via the processor for adding a convolutional defense layer to a neural network containing orthogonal kernels;
   generating the convolutional defense layer based on generating a set of learned kernels to increase diversity of network architecture, wherein generating the set of learned kernels includes feeding an output of the convolutional defense layer into the neural network, further wherein generating the convolutional defense layer includes:
   selecting one or more orthogonal kernels,
   duplicating the one or more selected orthogonal kernel in the convolutional defense layer N−1 times, wherein N−1 represents a total number of orthogonal kernels in the convolutional defense layer, and arranging the one or more selected orthogonal kernels in a specified order;
training the neural network with the added convolutional defense layer based on the increased diversity of network architecture; and
defending against adverse attacks via constraining an effect of adversarial data generated by the adversarial attacks.

2. The system of claim 1, wherein the adversarial attacks include one or more of: (i) white-box attacks, and (ii) black-box attacks.

3. The system of claim 1, wherein the convolutional defense layer is added to a front-end of the neural network.

4. The system of claim 1, wherein a new neural network with the added convolutional defense layer is further deployed for classification, wherein deploying for classification includes assembling a particular neural network based on the set of learned kernels.

5. The system of claim 1, wherein the performance of adversarial attacks is measured by a fooling rate $$F_{rate} = \frac{\sum_{m=0}^{M} y_m \neq Z_m}{N}.$$

6. The system of claim 1, wherein the set of learned kernels $S_k$ includes a maximum number of orthogonal kernels N−1, wherein N=W×H×C.

7. The system of claim 1, wherein constraining the effect of adversarial data generated by adversarial attacks includes the convolutional defense layer mapping input images to zero-vector-like features in different sub-spaces than adversarial images generated by adversarial attacks.

8. The system of claim 1, wherein the one or more selected orthogonal kernels are duplicated before being arranged in the specified order.

9. Non-transitory computer-readable storage media having instructions stored thereupon that, when executed by a system having at least a processor and a memory therein, the instructions cause the system to defend against adversarial attacks on neural networks, by performing operations including:
executing instructions via the processor for adding a convolutional defense layer to a neural network containing orthogonal kernels;
generating the convolutional defense layer based on generating a set of learned kernels to increase diversity of network architecture, wherein generating the set of learned kernels includes feeding an output of the convolutional defense layer into the neural network, further wherein generating the convolutional defense layer includes:
selecting one or more orthogonal kernels,
duplicating the one or more selected orthogonal kernel in the convolutional defense layer N−1 times, wherein N−1 represents a total number of orthogonal kernels in the convolutional defense layer, and
arranging the one or more selected orthogonal kernels in a specified order;
training the neural network with the added convolutional defense layer based on the increased diversity of network architecture; and
defending against adverse attacks via constraining an effect of adversarial data generated by the adversarial attacks.

10. The non-transitory computer-readable storage media of claim 9:
wherein the adversarial attacks include one or more of: (i) white-box attacks, and (ii) black-box attacks; and
wherein the convolutional defense layer is added to a front-end of the neural network.

11. The non-transitory computer-readable storage media of claim 9, wherein the neural network with the added convolutional defense layer is further deployed for classification, wherein deploying for classification includes assembling a particular neural network based on the set of learned kernels.

12. The non-transitory computer-readable storage media of claim 9, wherein the performance of adversarial attacks is measured by fooling rate $$F_{rate} = \frac{\sum_{m=0}^{M} y_m \neq Z_m}{N}.$$

13. The non-transitory computer-readable storage media of claim 9, wherein the set of learned kernels $S_k$ includes a maximum number of orthogonal kernels N−1, wherein N=W×H×C.

14. The non-transitory computer-readable storage media of claim 9, wherein constraining the effect of adversarial data generated by adversarial attacks includes the convolutional defense layer mapping input images to zero-vector-like features in different sub-spaces than adversarial images generated by adversarial attacks.

15. The non-transitory computer-readable storage media of claim 9, wherein the one or more selected orthogonal kernels are duplicated before being arranged in the specified order.

16. A method performed by a system having at least a processor and a memory therein to execute instructions for defending against adversarial attacks on neural networks, wherein the method comprises:
executing instructions via the processor for adding a convolutional defense layer to a neural network containing orthogonal kernels;
generating the convolutional defense layer based on generating a set of learned kernels to increase diversity of network architecture, wherein generating the set of learned kernels includes feeding an output of the convolutional defense layer into the neural network, further wherein generating the convolutional defense layer includes:
selecting one or more orthogonal kernels,
duplicating the one or more selected orthogonal kernel in the convolutional defense layer N−1 times, wherein N−1 represents a total number of orthogonal kernels in the convolutional defense layer, and
arranging the one or more selected orthogonal kernels in a specified order;
training the neural network with the added convolutional defense layer based on the increased diversity of network architecture; and
defending against adverse attacks via constraining an effect of adversarial data generated by the adversarial attacks.

17. The method of claim 16, wherein the adversarial attacks include one or more of: (i) whitebox attacks, and (ii) black-box attacks.

18. The method of claim 16:
wherein the convolutional defense layer is added to a front-end of the neural network;
wherein the neural network with the added convolutional defense layer is further deployed for classification, wherein deploying for classification includes assembling a particular neural network based on the set of learned kernels; and
wherein the performance of adversarial attacks is measured by a fooling rate $$F_{rate} = \frac{\sum_{m=0}^{M} y_m \neq Z_m}{N}.$$

19. The method of claim 16, wherein constraining the effect of adversarial data generated by adversarial attacks includes the convolutional defense layer mapping input images to zero-vector-like features in different sub-spaces than adversarial images generated by adversarial attacks.

20. The method of claim 16, wherein the set of learned kernels $S_k$ includes a maximum number of orthogonal kernels $N-1$, wherein $N=W \times H \times C$.

* * * * *